United States Patent
McCormack et al.

(10) Patent No.: US 11,621,932 B2
(45) Date of Patent: Apr. 4, 2023

(54) SYSTEM AND METHOD FOR MANAGING RESOURCES OF AN ENTERPRISE

(71) Applicant: Avaya Inc., Santa Clara, CA (US)

(72) Inventors: Tony McCormack, Galway (IE); Neil O'Connor, Galway (IE); John McGreevy, Galway (IE)

(73) Assignee: Avaya Inc., Morristown, NJ (US)

( * ) Notice: Subject to any disclaimer, the term of this patent is extended or adjusted under 35 U.S.C. 154(b) by 358 days.

(21) Appl. No.: 14/530,121

(22) Filed: Oct. 31, 2014

(65) Prior Publication Data

US 2016/0127553 A1 May 5, 2016

(51) Int. Cl.
| | |
|---|---|
| *H04L 12/66* | (2006.01) |
| *H04M 3/00* | (2006.01) |
| *H04M 5/00* | (2006.01) |
| *H04L 51/04* | (2022.01) |
| *H04M 3/51* | (2006.01) |
| *H04M 3/523* | (2006.01) |
| *H04M 7/00* | (2006.01) |

(52) U.S. Cl.
CPC .......... *H04L 51/04* (2013.01); *H04M 3/5191* (2013.01); *H04M 3/5232* (2013.01); *H04M 7/0045* (2013.01)

(58) Field of Classification Search
CPC .. H04M 3/5175; H04M 3/5116; H04M 3/493; H04M 3/51; H04M 2203/355; H04M 3/523; H04M 3/5232; H04M 2203/552; H04M 2250/66; H04M 3/42068; H04M 3/5183; H04M 3/5191; H04M 3/5233; H04M 2203/402; G06F 19/3418; G06F 19/345; G06F 11/0742; G06F 21/128; G06Q 10/06; G06Q 30/0246; G06Q 30/0269; G06Q 10/063114; G06Q 10/06393; G06Q 30/0245; H04L 41/18; H04L 41/5064; H04L 67/14; H04L 67/24
USPC ............ 379/265.06, 265.03, 265.09, 265.02, 379/201.02, 265.01, 88.11, 88.22
See application file for complete search history.

(56) References Cited

U.S. PATENT DOCUMENTS

| | | | | |
|---|---|---|---|---|
| 7,457,404 | B1 * | 11/2008 | Hession | G10L 15/26 |
| | | | | 379/265.07 |
| 8,379,830 | B1 * | 2/2013 | Naik | H04M 3/493 |
| | | | | 379/265.02 |
| 9,178,999 | B1 * | 11/2015 | Hegde | H04M 3/5232 |
| 9,313,332 | B1 * | 4/2016 | Kumar | H04M 3/5232 |

(Continued)

*Primary Examiner* — Kharye Pope (57) ABSTRACT

A resource managing computer system for managing at least one resource in an enterprise is disclosed. The resource managing computer system includes a communication interface for establishing at least one web based chat communication session with at least one customer. The system further includes a monitoring module for monitoring one or more parameters associated with the at least one web based chat communication session. The system further includes a computing module for computing at least one confidence score based on the one or more monitored parameters of the at least one web based chat communication session. The system further includes an allocation module for allocating the at least one resource to the at least one web based chat communication session, wherein the allocation is performed based on the at least one computed confidence score.

18 Claims, 6 Drawing Sheets

(56) References Cited

U.S. PATENT DOCUMENTS

| | | | |
|---|---|---|---|
| 2002/0051530 A1* | 5/2002 | Sato | H04M 3/42221 379/265.01 |
| 2003/0212546 A1* | 11/2003 | Shaw | G06F 17/279 704/9 |
| 2004/0193468 A1* | 9/2004 | Mosquera | G06Q 10/06 705/7.22 |
| 2004/0264677 A1* | 12/2004 | Horvitz | H04M 3/527 379/265.02 |
| 2005/0105712 A1* | 5/2005 | Williams | G10L 13/027 379/265.02 |
| 2006/0106670 A1* | 5/2006 | Cai | G06Q 30/02 705/13 |
| 2006/0115070 A1* | 6/2006 | Bushey | H04M 3/5166 379/265.02 |
| 2007/0036332 A1* | 2/2007 | Busayapongchai | H04M 3/4933 379/265.09 |
| 2007/0043571 A1* | 2/2007 | Michelini | G10L 15/22 704/270.1 |
| 2007/0160054 A1* | 7/2007 | Shaffer | H04M 3/5175 370/395.2 |
| 2008/0004945 A1* | 1/2008 | Watson | G06Q 30/02 705/7.42 |
| 2008/0043987 A1* | 2/2008 | Waalkes | H04M 3/5234 379/265.11 |
| 2008/0112557 A1* | 5/2008 | Ricketts | G06Q 10/06 379/265.03 |
| 2008/0152122 A1* | 6/2008 | Idan | H04M 3/5175 379/265.07 |
| 2008/0267386 A1* | 10/2008 | Cooper | G06Q 30/02 379/265.06 |
| 2009/0003579 A1* | 1/2009 | Singh | H04M 3/4938 379/211.01 |
| 2009/0232283 A1* | 9/2009 | Zhang | H04M 3/523 379/80 |
| 2009/0245500 A1* | 10/2009 | Wampler | H04M 3/42382 379/265.09 |
| 2010/0086120 A1* | 4/2010 | Brussat | H04M 3/5233 379/265.12 |
| 2010/0226490 A1* | 9/2010 | Schultz | H04M 3/5233 379/265.09 |
| 2011/0010173 A1* | 1/2011 | Scott | H04M 3/42221 704/235 |
| 2011/0158398 A1* | 6/2011 | Kannan | H04L 12/1827 379/265.09 |
| 2011/0171939 A1* | 7/2011 | Deliwala | H04M 3/4938 455/414.1 |
| 2011/0307258 A1* | 12/2011 | Liberman | G10L 15/26 704/251 |
| 2012/0224681 A1* | 9/2012 | Desai | H04M 3/5166 379/266.1 |
| 2013/0124257 A1* | 5/2013 | Schubert | G06Q 30/02 705/7.29 |
| 2013/0152000 A1* | 6/2013 | Liu | G06F 9/44 715/765 |
| 2014/0140496 A1* | 5/2014 | Ripa | H04M 3/5133 379/265.06 |
| 2014/0140497 A1* | 5/2014 | Ripa | H04M 3/5133 379/265.06 |
| 2014/0188457 A1* | 7/2014 | Fink | G06F 17/2785 704/9 |
| 2014/0188459 A1* | 7/2014 | Fink | G06F 17/2785 704/9 |
| 2014/0192971 A1* | 7/2014 | Sri | H04M 3/5191 379/265.09 |
| 2015/0178371 A1* | 6/2015 | Seth | G06F 16/3329 707/748 |
| 2015/0264146 A1* | 9/2015 | Cudak | H04M 3/42365 379/142.01 |
| 2016/0048502 A1* | 2/2016 | Montenegro | G06Q 30/016 379/265.1 |

* cited by examiner

SYSTEM AND METHOD FOR MANAGING RESOURCES OF AN ENTERPRISE

BACKGROUND

1. Field

Embodiments of the present invention generally relate to a system and method to manage resources of an enterprise and particularly to a system and method for managing inbound and outbound contacts of an enterprise.

2. Description of Related Art

Contact centers are employed by many enterprises to service, inbound and outbound contacts or customers. A primary objective of contact center management is to ultimately maximize contact center performance and profitability. An ongoing challenge in contact center administration is monitoring and optimizing contact center efficiency usage of its available resources. The contact center efficiency is generally measured by metrics such as Service Level Agreement (SLA), Customer Satisfaction (CSAT), and match rate. Contact center resources may include, agents, communication assets (e.g., number of voice trunks, number and bandwidth of video trunks, etc.), computing resources (e.g., a speed, a queue length, a storage space, etc.), and so forth.

Service level is one measurement of the contact center efficiency. Service level is typically determined by dividing the number of contacts accepted within a specified period by the number accepted plus number that were not accepted, but completed in some other way (e.g., abandoned, given busy, canceled, flowed out). Service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent in a queue over the same period. An agent with a primary skill level is one who typically may handle contacts of a certain nature more effectively and/or efficiently as compared to an agent of lesser skill level. There are other contact center agents who may not be as proficient as the primary skill level agent, and those agents are identified either as skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with the service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements ("SLAs"). Operational efficiency is achieved when the KPIs are managed near, but not above, SLA threshold levels.

Throughput is a measure of the number of contacts/contact requests or work requests that may be processed in a given amount of time. Agent utilization is a measure of how efficiently the agents' time is being used. Customer service level is a measure of the time customers spend waiting for their work to be handled. Company contact center customers wish to provide service to as many requests as possible in a given amount of time, using the least number of agents to do so, and minimizing the wait time for their customers that may increase the Service Level Agreement (SLA) of the contact center. Further, the contact center may also have to maintain the Customer Satisfaction (CSAT) metrics in order to maintain the KPIs of the contact center. For this purpose, agents may have to maintain the quality of services provided to the customers through multimedia (e.g., voice contacts, video contacts, emails, etc.).

Generally, in order to improve the efficiency of a contact center, agents communicate with customers to provide customer services. The customers can communicate with the agents of the contact center through multiple types of communication sessions, for example, a voice session, a video session, a text message, an email, and so forth. One of the most widely used types of communication sessions is a web based chat communication session. Nowadays, various automated web based chat communication session techniques are available, in which, an automated answering machine is used to provide customer service to customers based on their queries in a real time environment. The automated answering machine can provide customer service to the customers by using knowledge databases and artificial intelligence systems. Also, the automated web based chat communication session can be used by the contact center for both inbound contact operations and outbound contacts. However, conventional automated web based chat techniques do not every time provide satisfactory or relevant customer service to the customers of the contact center. There are stages where customers are not satisfied with the services provided by the automated web chat machines and feel necessity for a live chat with concerned agents to better address their queries. Nevertheless, in modern contact centers this issue is resolved by providing a live chat service option to customers who avails automated web chat service. However, this technique is not reliable as its success totally depends on the availability of agents for entertaining multiple the live chat requests. If number of live chat requests exceeds the number of available agents then the customers are required to wait in queue for the availability of agents, which may further reduce the efficiency of the contact center.

There is thus a need for a system and method for managing resources of a contact center to control both inbound and outbound contact operations based on availability of agents. Further, there is a need for a system and method to provide a fair judgment corresponding to customers who are not satisfied with the automated web based chat service and may desire for a live chat service.

SUMMARY

Embodiments in accordance with the present invention provide a computer-implemented method for managing at least one resource in an enterprise. The method includes establishing at least one web based chat communication session with at least one customer; monitoring one or more parameters associated with the at least one web based chat communication session; computing at least one confidence score based on the one or more monitored parameters of the at least one web based chat communication session; and allocating the at least one resource to the at least one web based chat communication session, wherein the allocation is performed based on the at least one computed confidence score.

Embodiments in accordance with the present invention further provide a resource managing computer system for managing at least one resource in an enterprise. The resource managing computer system includes a communication interface for establishing at least one web based chat communication session with at least one customer. The system further includes a monitoring module for monitoring one or more parameters associated with the at least one web based chat communication session. The system further includes a computing module for computing at least one confidence score based on the one or more monitored parameters of the at least one web based chat communication session. The system further includes an allocation module for allocating the at least one resource to the at least one web based chat communication session, wherein the allocation is performed based on the at least one computed confidence score.

Embodiments in accordance with the present invention further provide a computer-implemented method for managing at least one resource in an enterprise. The method includes establishing at least one web based chat communication session with at least one customer; monitoring one or more parameters associated with the at least one web based chat communication session; computing at least one confidence score based on the one or more monitored parameters of the at least one web based chat communication session; allocating the at least one resource to the at least one web based chat communication session, wherein the allocation is performed based on the at least one computed confidence score; and routing the at least one web based chat communication session to the at least one allocated resource.

Embodiments of the present invention may provide a number of advantages depending on its particular configuration. First, embodiments of the present application provide a system and a method for managing resources of a contact center. Embodiments of the present application provide a system and a method whereby in addition to usage of statistical models for contact lengths (e.g., traditional mechanism), a mathematical algorithm is used to determine likelihood of ongoing automated web chat sessions needing to be upgraded to an agent-assistance. For example, if 80% of the ongoing web chat communication sessions are automated, then it would be appreciable that the offering of the web chat takes into account significant overall swings (e.g., ups or downs) in confidence factors.

Next, embodiments of the present application generate a confidence factor for every ongoing automated web based chat communication session between a customer and an IM server. The confidence factor is used to determine whether an ongoing automated web based chat communication session needs transition to an agent-assist communication session based on priorities of outbound web based chat communication sessions. Thus, if it is determined that agent's time should be prioritized for outbound web based chat communication sessions versus inbound web based chat communication sessions as high value customers may be contacted during a campaign, then this is achieved by increasing a threshold level used before an automated chat transition for requiring agent services.

Further, embodiments of the present application predict availability of agents in an enterprise for outbound web based chat communication sessions by combining traditional mathematical algorithms with the computed confidence factor of ongoing automated web based chat communication session. Next, the system improves both outbound and inbound contact scheduling. It is very common to offer live chat with an agent to a website visitor. However, embodiments of the present invention provide a means of ensuring that an agent is available to interact with a customer that is offered such a web based chat communication session. Further, if there is a need to priorities outbound chat requests based on a new marketing campaign, which is drawing customers to a target website, then the threshold level for escalating other automated outbound web based chat communication sessions can be optimized. The embodiments of the present invention therefore provide superior web chat features through usage of an estimated automated confidence factor for both inbound and outbound web based chat communication sessions.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

The terms "customer" and "contact" may be used interchangeably in certain context of this disclosure of the present invention when referring to one or more persons/entity contacting a contact center, usually to reach an IVR system and/or one or more agents for assistance. In another context contemplated by the present invention, a "customer" may have more than one contact with the contact center at, or nearly at, the same time. For example, a customer may communicate with a contact center by way of telephone and by way of a chat, thus counting as one customer but two contacts.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

Figure 1A:
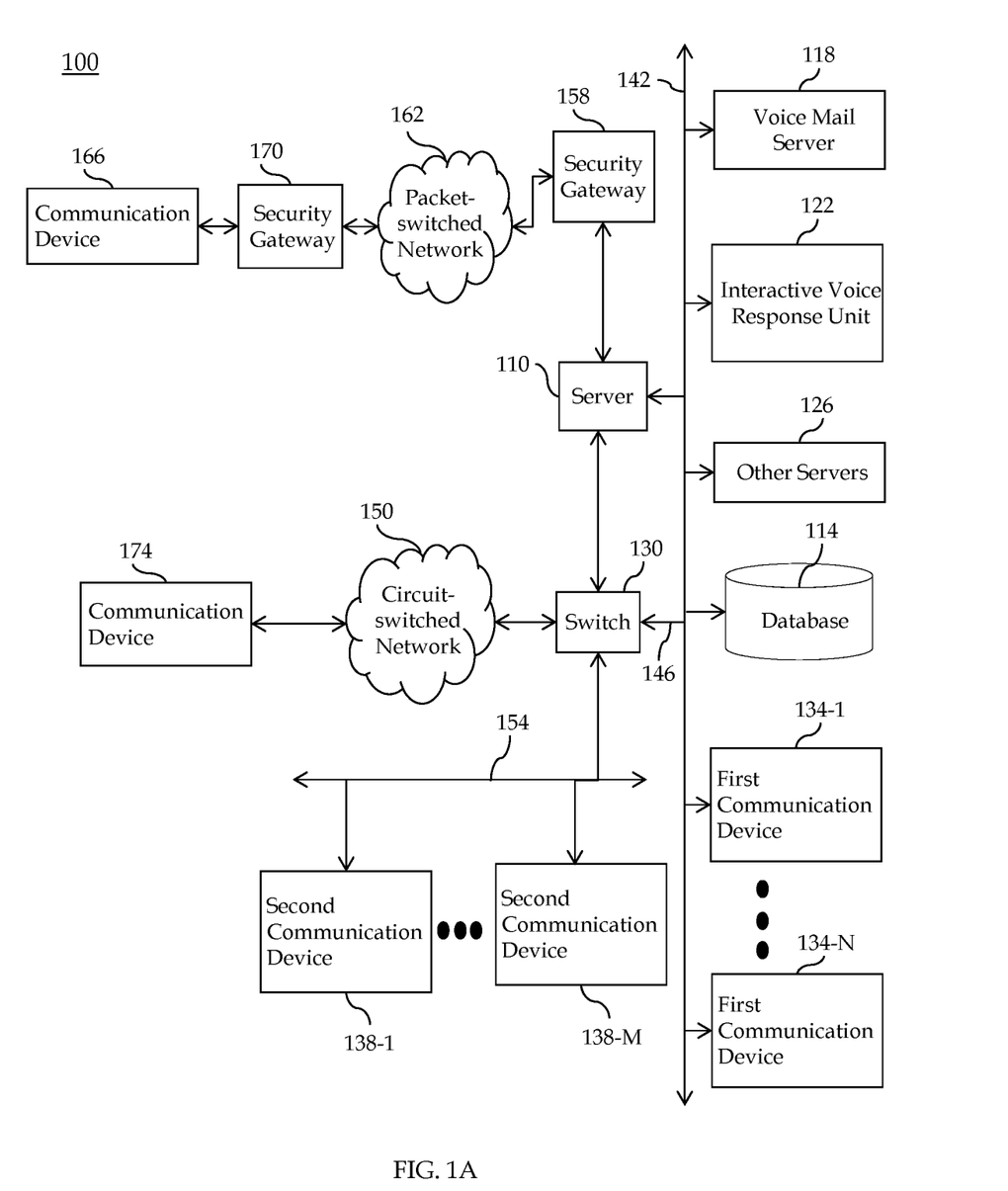
FIG. 1A illustrates a block diagram depicting a contact center, according to an embodiment of the present invention.

FIG. 1A shows an illustrative embodiment of the present invention. A contact center 100 comprises a server 110, a set of data stores or databases 114 containing contact or customer related information, resource or agent related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). In another embodiment of the present invention, the customer and agent related information may be replicated over multiple repositories.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an Instant Messaging (IM) server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) may be Avaya Inc.'s, G700 Media Gateway™ and may be implemented as hardware such as via an adjunct processor (as shown) or as a chip in the server 110.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, 58300™ media server and any other media servers, SIP Enabled Services™, Intelligent Presence Server™, and/or Avaya Interaction Center™, and any other products or solutions offered by Avaya, or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that embodiments of the present invention do not require any particular type of information transport medium between switch, or server and first and second communication devices, i.e., embodiments of the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized the configuration of the switch 130, the server 110, user communication devices, and other elements as shown in FIG. 1A is for purposes of illustration only and should not be construed as limiting embodiments of the present invention to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Figure 1B:
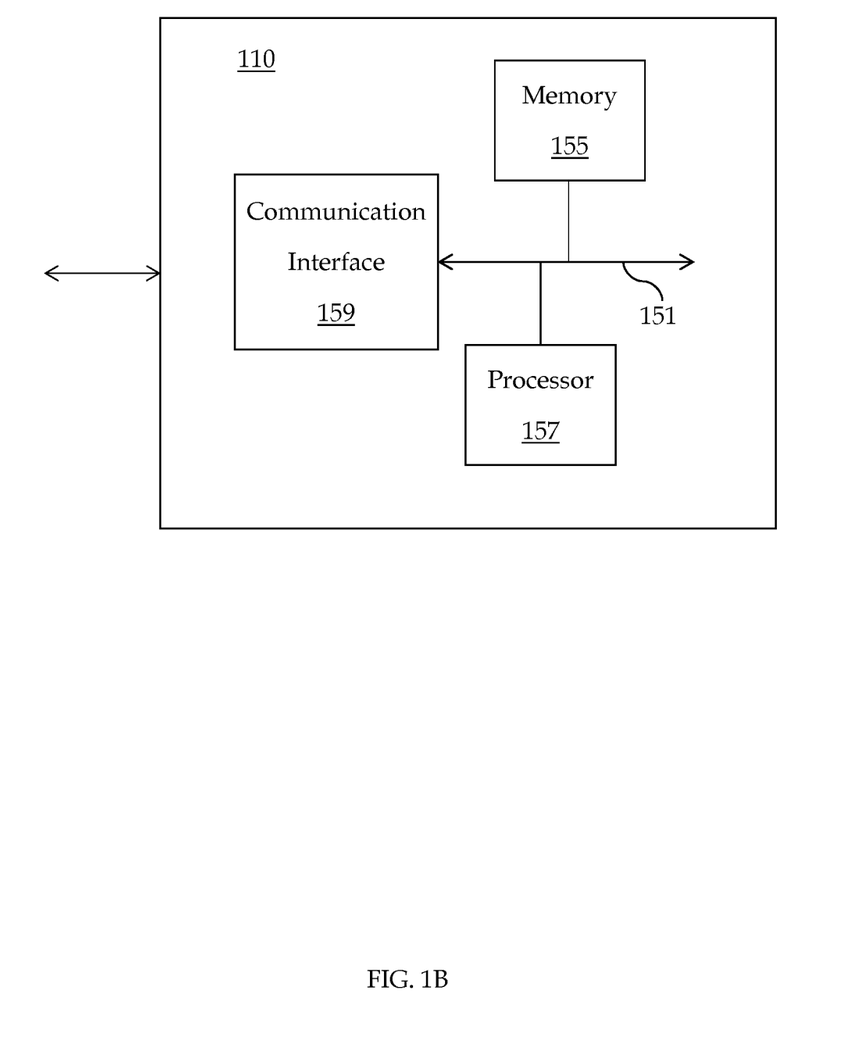
FIG. 1B illustrates a high level hardware abstraction of a block diagram of a server, according to an embodiment of the present invention.

FIG. 1B illustrates at a relatively high-level hardware abstraction of a block diagram of a server such as the server 110, in accordance with an embodiment of the present invention. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments of the present invention do not require the presence of packet- or circuit-switched networks.

Figure 2:
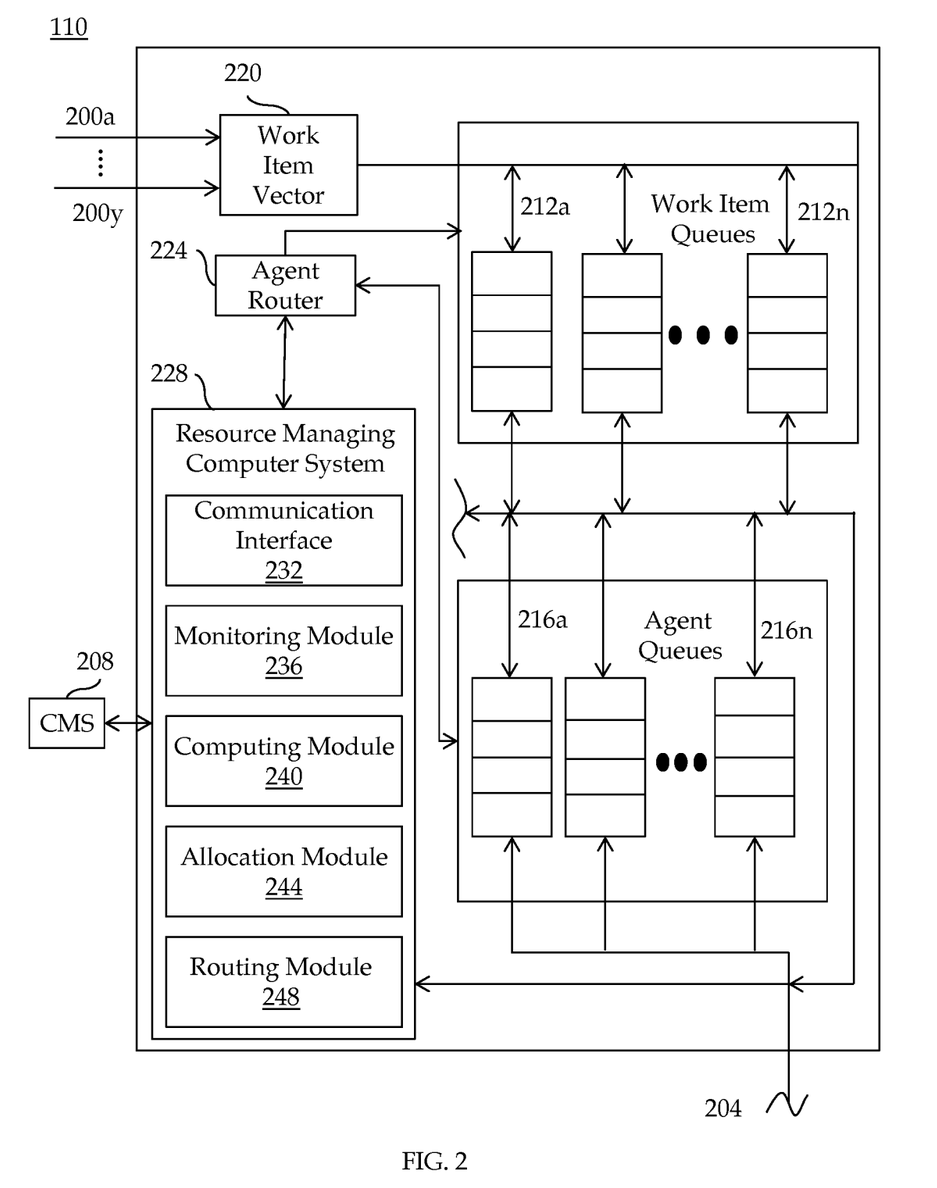
FIG. 2 illustrates a functional block diagram of the server that may be used in the contact center, according to an embodiment of the present invention.

Referring to FIG. 2, one possible configuration of the server 110 is depicted at a relatively high level of functional abstraction, according to an embodiment of the present invention. The server 110 is in communication with a plurality of contact or customer communication lines 200a-y (which may be one or more trunks, phone lines, etc.) and an agent communication line 204 (which may be a voice-and-data transmission line such as the LAN 142 and/or a circuit switched voice line). The server 110 may include Avaya Inc.'s Operational Analyst™ (OA) with On-Line Analytical Processing (OLAP) technology or a Call Management System (CMS) 208 that gathers contact records. OA and CMS will hereinafter be referred to jointly as CMS 208.

As shown in FIG. 2, among the data stored in the server 110 is a set of contact or work item queues 212a-n and a separate set of agent queues 216a-n. Each contact queue 212a-n corresponds to a different set of agent queues, as does each agent queue 216a-n. Conventionally, contacts are prioritized and either are queued in individual ones of the contact queues 212a-n in their order of priority or are queued in different ones of a plurality of contact queues 212a-n that correspond to a different priority. Likewise, each agent's queues are prioritized according to his or her level of expertise or skill in that queue, and agents are queued in either individual ones of agent queues 216a-n in their order of expertise level, or in different ones of a plurality of agent queues 216a-n that correspond to a queue and each one of which corresponds to a different expertise level. In an embodiment of the present invention, the agent queue 216a-n may include a set of reserve agents queue in the contact center 100.

According to an embodiment of the present invention, included among the control programs in the server 110 is a work item vector 220. Contacts or calls incoming to the contact center 100 are assigned by the work item vector 220 to different work item queues 212a-n based upon a number of predetermined criteria, including a customer's identity, customer needs, contact center needs, current contact center queue lengths, a customer value, and an agent skill that is required for proper handling of the contact. Agents who are available for handling work items are assigned to the agent queues 216a-n based upon the skills that they possess. An agent may have multiple skills, and hence may be assigned to multiple agent queues 216a-n simultaneously. Furthermore, an agent may have different levels of skill expertise (e.g., skill levels 1-N in one configuration or merely primary skill levels and secondary skill levels in another configuration), and hence may be assigned to different agent queues 216a-n at different expertise levels.

In one configuration, the contact center 100 is operated by a contract operator (e.g., a supervisor or a manager of the contact center 100), and each of the work item queues 212a-n, and possibly each of the agent queues 216a-n, corresponds to a different client. Each client may have a separate Service Level Agreement (SLA) or other type of performance measurement agreement with the contract operator regarding performance expectations, goals, requirements or specifications for the client's respective queue(s).

Further, embodiments in accordance with the present invention may include, among the programs executing on the server 110, an agent router or selector 224 and a resource managing computer system 228. The agent selector 224 and the resource managing computer system 228 are stored either in the main memory or in a peripheral memory (e.g., disk, CD ROM, etc.) or some other computer-readable medium of the contact center 100. Further, the agent selector 224 monitors the occupants of the work item and agent queues 212a-n and 216a-n, respectively, and contact center objectives, rules, and policies and select agents to service work items.

The agent selector 224 distributes and connects these work items to communication devices of available agents based on the predetermined criteria noted above. When the agent selector 224 forwards a contact (or first work item) to an agent, the agent selector 224 also forwards customer-related information from the database 114 to the agent's desktop or computer work station for previewing and/or viewing (such as by a pop-up display) to enable the agent for providing better services to the customer. Depending on the contact center configuration, the agent selector 224 may reallocate the work items to the agents of the contact center 100. The agents process the contacts or work items sent to them by the agent selector 224.

In an embodiment of the present invention, the agent and their associated data are maintained and updated in the database 114 of the contact center 100. Upon the completion of handling a work item, a generator (not shown) collects selected metrics for the work item. These metrics may include skills involved in servicing the work item, an identifier of a servicing agent, contact duration, a transaction or contact type (e.g., sale, information request, complaint, etc.), time-of-day, result of the contact (e.g., type of sale, number of units sold, an average revenue generated, etc.), and so forth. The metrics along with other statistics is typically gathered by the CMS 208.

In an exemplary embodiment of the present invention, the resource managing computer system 228 may manage inbound as well as outbound marketing campaigns for an enterprise (e.g., a contact center). Further, the resource managing computer system 228 may schedule a number of outbound contacts targeting registered or non-registered customers of the contact center 100. The outbound contact technology may include any state of the art communication technology such as but is not limited to, an automated web chat service, where an Instant Messaging (IM) server (not shown) communicates with customers by using knowledge databases, state of the art artificial intelligence, and natural language processors. In an exemplary scenario, the IM server stored in the resource managing computer system 228 may engage the customers by providing promotional offers, business information, guidance information, and so forth. Hereinafter, the outbound as well as the inbound chat sessions between the IM server and customers will be referred to as "automated web based chat communication sessions".

According to an embodiment of the present invention, the resource managing computer system 228 includes certain modules, such as, but is not restricted to, a communication interface 232, a monitoring module 236, a computing module 240, an allocation module 244, and a routing module 248. In some embodiments, one or more of the communication interface 232, the monitoring module 236, the computing module 240, the allocation module 244, and the routing module 248 may be implemented by one or more software processes running on the server 110. The server 110 may implement one or more software processes by use of the processor 157 being suitably programmed by use of software instructions stored in the memory 155 coupled to the processor 157.

The communication interface 232 may establish a communication session with a customer of a contact center 100, according to an embodiment of the present invention. The communication session may be, but is not restricted to, a web based chat communication session. In an exemplary scenario, the customer may desire to participate in a promotional or a business campaign associated with the contact center 100 and, therefore, a web based chat communication session is established by the communication interface 232.

The monitoring module 236 may monitor data associated with the customer, according to an embodiment of the present invention. The monitoring module 236 may monitor data associated with potential customers browsing a web page or a website of the contact center 100. Further, the monitoring module 236 may monitor profiles of the customers, according to an embodiment of the present invention. The profile of the customer may include, but is not restricted to, a name, a phone number, an address, an email address, likes, hobbies, web browsing history, and so forth. In an embodiment of the present invention, the monitoring module 236 may collect the data and/or profile of the customer based on web browsing history, for example, via cookies. The monitoring module 236 may collect the data and/or profile of the customer stored in the database 114.

Further, the monitoring module 236 may collect profiles and data of agents that are available in the contact center 100 to provide customer services, according to an embodiment of the present invention. The profiles and data of available agents of the contact center 100 may be obtained in several ways and from several sources. In an exemplary scenario, an available agent may be, but is not restricted to, an idle agent, a least occupied agent, an agent who has not taken a contact for a longest time, and the like. A primary source for collecting the agent data may be the contact center 100. However, information included in the agent data may provide a limited view of the overall characteristics of the available agent, specifically the characteristics of the agent with respect to the contact center 100.

The agent profile may include, but is not restricted to, an agent's self-description, skill sets, likes, locations, and so forth. The agent's skill sets may include, but is not restricted to, an agent's interests, education and work histories, technical training, experience supporting a particular industry, company, or caller, and so forth. The agent skill set may also include, but is not restricted to hobbies, hometowns, favorite sport teams and TV shows, cultural background, and so on, to the extent that such information may be relevant to support of callers to the contact center. In an embodiment of the present invention, the agent profile may be stored and maintained in the database 114 of the contact center 100.

As used herein, the term "agent skill set" may refer to the set of agent data that is used by the contact center 100 to characterize an agent. Such agent data may include, but is not restricted to, biographical agent data, demographic agent data, and external or internal behavioral agent data, to name a few. The behavioral data may include the agent's history with respect to the contact center 100 and/or any other entity or social media channel. However, the agent data is not limited in this regard and may include any other type of agent data used by the contact center 100 to characterize or classify agents. Further, the agent data may include any other agent data collected from one or more sources external to the contact center 100. Additionally, the agent profile may be raw data or processed agent data. That is, the agent data may be analyzed to characterize the agent and thereafter used to provide customized or personalized services to the customer. For example, an agent profile may be a set of values associated with an agent and a set of characteristics, where the values are selected based on the agent data obtained. However, embodiments of the present invention are not limited in this regard and any other methods for evaluating agent data to provide services that may be used without limitation. Accordingly, in another embodiment of the present invention, a secondary source of agent data may be utilized, e.g., social media channels. For example, the contact center 100 may access and monitor social media channels (not shown in figure) to help determined agent skills. The profile of the agent of the contact center 100 may be updated automatically at configurable intervals, in an embodiment of the present invention.

Further, the monitoring module 236 may monitor attributes or details of the communication session, according to an embodiment of the present invention. The details of the communication session may include, but is not restricted to, a type of the communication session i.e., whether the communication session made by a customer is, but is not limited to, a video session, a voice session, textual conversation session, an email, a web based chat session, a Voice over Internet Protocol (VoIP), an instant messaging session, and so forth. Further, the monitoring module 236 may monitor static details of the communication session based on inputs selected by the customer in an IVR menu of the contact center 100, in an embodiment of the present invention. For example, a customer select inputs such as a button "5" for a "health insurance policy", and "2" for "inquiry" in the IVR menu, the monitoring module 236 may extract information that the customer desires to inquire about a health insurance policy.

The monitoring module 236 may detect sentiments of the customer, according to an embodiment of the present invention. The sentiments may include, but is not restricted to, a positive sentiment, a negative sentiment, a neutral sentiment, and so forth. The positive sentiment may indicate that the customer is happy and satisfied from customer services of the contact center 100. Examples of the positive sentiments may be, but is not restricted to, fulfilled, glad, optimistic, and so forth. The negative sentiments may indicate that the customer is unhappy and unsatisfied from customer services of the contact center 100. Examples of the negative sentiment may be, but is not restricted to, frustrated, angry, irritated, and so forth. The neutral sentiment may indicate that the customer is not fully satisfied or happy but is not fully unsatisfied or unhappy from the customer services of the contact center 100. In an embodiment of the present invention, the monitoring module 236 may detect sentiments of the customer from start of the communication session to an end of the communication session. For example, sentiments at the start of a communication session may be okay but deteriorates as the communication session proceeds. The monitoring module 236 may also detect the sentiments in non-voice communication sessions, for example, text messages, emails, instant messages, web chats, and so forth Further, the monitoring module 236 may monitor automated web chat communication sessions that are active with the customer, according to an embodiment of the present invention. The monitoring module 232 may further extract attributes associated with the active automated web chat communication session, according to an embodiment of the present invention. The attributes associated with the automated web chat communication session may include, but are not limited to, content, context, and time associated with the automated web chat communication sessions. In an embodiment of the present invention, the content, context, and time are monitored for every set of data (i.e., communication data) exchanged with the customers.

Further, the monitoring module 236 may measure a relevancy level of automated responses submitted by the server 110 (for example, the IM server) in response to the customer's query, according to an embodiment of the present invention. The monitoring of the communication session may be carried out in a real time environment.

The computing module 240 may compute a confidence score based on the monitored parameters of the communication session, according to an embodiment of the present invention. The confidence score may indicate a confidence level of responses or services provided to the customers of the contact center 100. In an exemplary scenario, a high confidence score may indicate that the services provided to the customer are satisfactory and the customer is happy with the services. A low confidence score may indicate that the services provided to the customer are not satisfactory and the customer is not happy with the services. In an embodiment of the present invention, the computing module 240 may use predefined mathematical algorithms to compute the confidence score for the web based chat communication session. In another embodiment of the present invention, the computing module 240 may use fuzzy logic to compute the confidence score for the web based chat communication session.

Further, the computing module 240 may compare the computed confidence score with a threshold level to determine automated web based chat communication sessions for which the IM server is not sufficiently confident about response acceptance by the customer. Further, the computing module 240 may determine automated web based chat communication sessions that require human assistance for providing customer services based on the threshold level, according to an embodiment of the present invention. Based on the determination, a ratio of available agents in the contact center 100 versus agents that are required to provide customer services is calculated (based on the confidence scores) to determine if sufficient agents are available for handling the automated web based chat communication sessions. Further, the computing module 240 may optimize and/or adjust the threshold level based on the number of agents available in the contact center 100 to provide customer services, according to an embodiment of the present invention. In an exemplary scenario, if number of available agents is less, then a threshold level may be adjusted to a higher threshold level.

In an exemplary scenario, if an IM server is handling 1000 automated web based chat communication sessions simultaneously and a confidence score of 100 web chat sessions (out of 1000) is below 6 (considering a threshold level being 6 from a scale of 1-10) then at least 50 agents (considering 1 agent is capable of handling maximum two contacts at a time) are required for providing services to 100 web based chat communication sessions. In case, if only 40 agents are available and there are 80 web chat communication sessions (out of 1000) for which the confidence score is measured to be 7 then the threshold level may be adjusted to 8 (as 7 score is lower than 8) by the computing module 240 and only those 80 automated web based chat communication sessions will be offered to switch to agent-assisted based chat communication sessions. This will ensure availability of agents to all those automated web based chat communication sessions for which agent-assisted web based chat communication session is offered.

The computing module 240 may also optimize number of web based chat communication sessions in the contact center 100, according to an embodiment of the present invention. In an exemplary scenario, the computing module 240 limit a rate at which the outbound or inbound contacts (e.g., engages customers with new automated web based chat communication sessions) for events, such as promotional or business campaigns. This may limit the total number of active automated web chat communication sessions and, therefore, may also limit the number of web based chat communication sessions that require agent assistance. For example, if an IM server is engaging 10 customers every minute (by offering them computer assisted web chat communication session) and it is determined that all agents are occupied in providing customer services to the customers then the IM server may stop engaging more customers until few agents become available for providing customer services.

The allocation module 244 may allocate a resource to the web based chat communication session based on the computed confidence score, according to an embodiment of the present invention. The resource is allocated to a web based chat communication session having a confidence score less than the threshold level. In an embodiment of the present invention, a resource may be, but is not limited to, a reserve agent, an idle agent, an agent, a trainee agent, a Subject Matter Expert (SME), a supervisor, a manager, and the like. In an embodiment of the present invention, the allocation module 244 may automatically allocate an agent from a list of available agents based on the computed confidence score to provide customer service. In another embodiment of the present invention, the allocation module 244 may enable the supervisor of the contact center 100 to allocate an agent from a list of available agents based on the computed confidence score to provide customer service.

The routing module 248 may route the web based chat communication session to the allocated agent of the contact center 100, according to an embodiment of the present invention. In an exemplary scenario, the web based chat communication session is routed to the allocated agent of the contact center 100 if the allocated agent is currently available.

Figure 3:
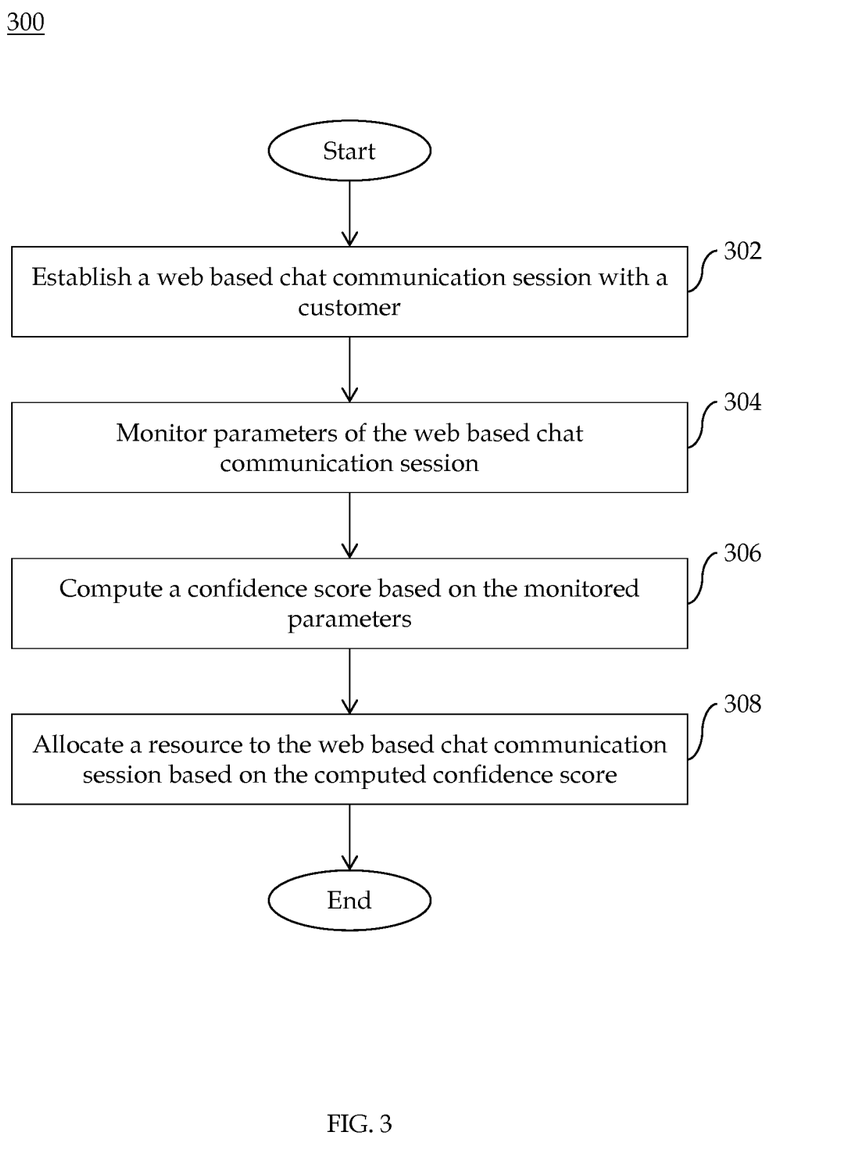
FIG. 3 depicts a flowchart of a method for managing resources in the contact center, according to an embodiment of the present invention.

FIG. 3 depicts a flowchart of a method for managing a resource in a contact center 100, according to an embodiment of the present invention.

At step 302, a resource managing computer system 228 establishes a communication session with a customer of the contact center 100, according to an embodiment of the present invention. The communication session may be, but is not restricted to, a web based chat communication session.

At step 304, the resource managing computer system 228 determines a number of active automated web based chat communication sessions and monitors parameters of the web based chat communication session, according to an embodiment of the present invention. The parameters of the web based chat communication session may include, but are not restricted to, details of a communication session, static details such as inputs selected by the customer in an IVR menu, profile and data associated with agents and/or customer, sentiments of a customer, relevancy level of responses provided by automated chat systems, and so forth.

Next, at step 306, the resource managing computer system 228 computes a confidence score based on the monitored parameters of the web based chat communication session, according to an embodiment of the present invention. In an exemplary scenario, a high confidence score may indicate that the customer services provided to the customer are satisfactory and the customer is happy with the services. A low confidence score may indicate that the customer provided to the customer are not satisfactory and the customer is not happy with the services. In an embodiment of the present invention, the resource managing computer system 228 compares the computed confidence score with a threshold level to determine whether the web based chat communication session needs agent assistance.

In an embodiment of the present invention, the resource managing computer system 228 may use predefined mathematical algorithms to compute the confidence score for the web chat communication session. In another embodiment of the present invention, the resource managing computer system 228 may use fuzzy logic to compute the confidence score for the web based chat communication session.

At step 308, the resource managing computer system 228 allocates a resource to the web based chat communication session, according to an embodiment of the present invention. The resource is allocated to a web based chat communication session having computed confidence score more than the threshold level. In an embodiment of the present invention, a resource may be, but is not limited to, a reserve agent, an agent, a trainee agent, a Subject Matter Expert (SME), a supervisor, a manager, and the like. In an embodiment of the present invention, the resource managing computer system 228 automatically allocates an agent from a list of available agents based on the computed confidence score to provide customer services. In another embodiment of the present invention, the resource managing computer system 228 enables the supervisor of the contact center 100 to allocate an agent from a list of available agents based on the computed confidence score to provide customer services. In an embodiment of the present invention, the resource managing computer system 228 provides an option to the customer to select if they desire to upgrade to agent assisted web chat communication session or not instead of seamlessly allocating agent service.

Figure 4A:
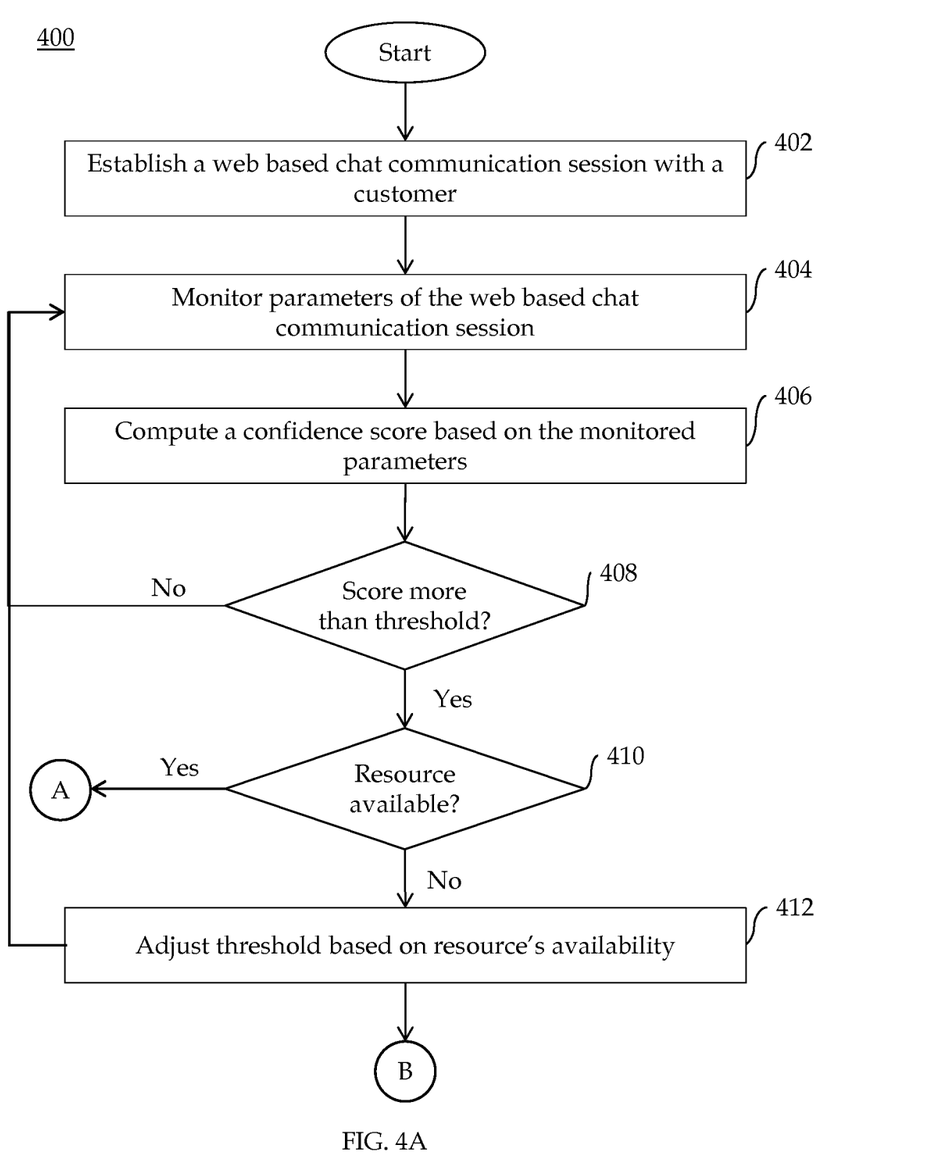
FIGS. 4A and 4B depict a flowchart of a method for managing resources in the contact center, according to another embodiment of the present invention.
Figure 4B:
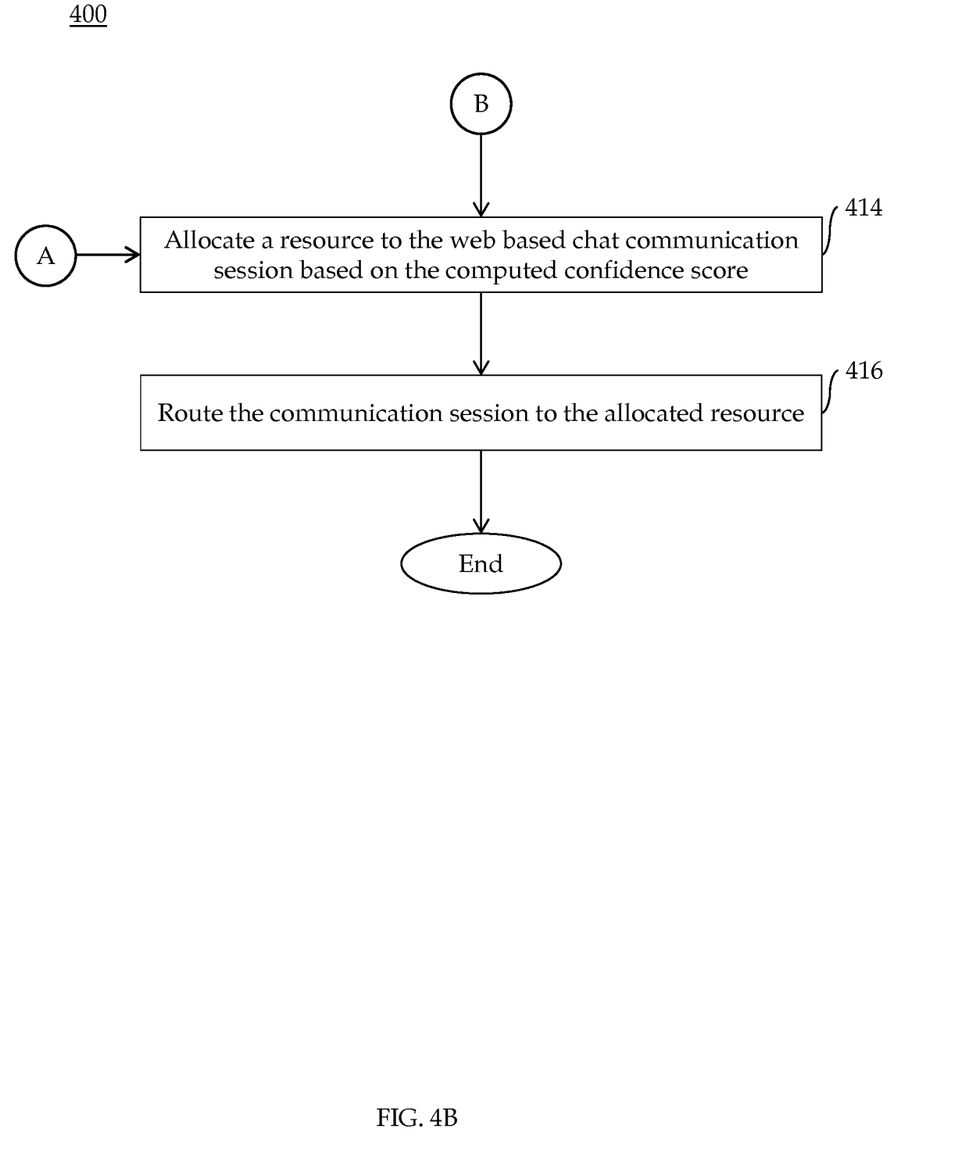

FIGS. 4A and 4B depict a flowchart of a method 400 for managing a resource in a contact center 100, according to another embodiment of the present invention.

At step 402, a resource managing computer system 228 establishes a communication session with a customer of the contact center 100, according to an embodiment of the present invention. The communication session may be, but is not restricted to, a web based chat communication session.

At step 404, the resource managing computer system 228 monitors parameters of the established web based chat communication session, according to an embodiment of the present invention. The parameters of the web based chat communication session may include, but are not restricted to, details of the communication session, static details such as inputs selected by the customer in an IVR menu, profile and data associated with agents and/or customer, sentiments of a customer, relevancy level of responses provided by automated chat systems, and so forth.

Next, at step 406, the resource managing computer system 228 computes a confidence score based on the monitored parameters of the web based chat communication session, according to an embodiment of the present invention. In an exemplary scenario, a high confidence score may indicate that the customer services provided to the customer are satisfactory and the customer is happy with the customer services. A low confidence score may indicate that the customer services provided to the customer are not satisfactory and the customer is not happy with the customer services. In an embodiment of the present invention, the resource managing computer system 228 may use predefined mathematical algorithms to compute the confidence score for the web based chat communication session. In another embodiment of the present invention, the resource managing computer system 228 may use fuzzy logic to compute the confidence score for the web based chat communication session.

At step 408, the resource managing computer system 228 determines whether the computed confidence score is more a threshold level. If it is determined that the computed confidence score is less than the threshold level then the method 400 returns to the step 404 and continues monitoring the parameters of the web based chat communication session. If it is determined that the computed confidence score is more than the threshold level then the method 400 proceeds towards step 410.

Thereafter, at step 410, the resource managing computer system 228 further determines whether a resource is available in the contact center 100 to provide customer services to the customer of the web based chat communication session. If it is determined that a resource is available then the method 400 proceeds towards step 414. If it is determined that a resource is not available then the method 400 proceeds towards step 412.

At step 412, the resource managing computer system 228 adjusts the threshold level based on the number of agents available in the contact center 100 to provide customer services, according to an embodiment of the present invention. In an exemplary scenario, if number of available agents is less, then a threshold level may be adjusted to a higher threshold level and if number of available agents is more, then a threshold level may be adjusted to a lower threshold level. Based on the adjustment of the threshold level, the method 400 returns to the step 404 to continue monitoring of the parameters of the web based chat communication session.

Further, at step 414, the resource managing computer system 228 allocates a resource to the web based chat communication session, according to an embodiment of the present invention. The resource is allocated to the web based chat communication session having computed confidence score is more than the threshold level. In an embodiment of the present invention, a resource may be, but is not limited to, a reserve agent, an agent, a trainee agent, a Subject Matter Expert (SME), a supervisor, a manager, and the like. In an embodiment of the present invention, the resource managing computer system 228 automatically allocates an agent from a list of available agents based on the computed confidence score to provide customer service. In another embodiment of the present invention, the resource managing computer system 228 enables the supervisor of the contact center 100 to allocate an agent from a list of available agents based on the computed confidence score to provide customer service.

At step 416, the resource managing computer system 228 routes the web based chat communication session to the allocated agent of the contact center 100, according to an embodiment of the present invention. In an exemplary scenario, the web based chat communication session is routed to the selected agent of the contact center 100 if the selected agent is currently available.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, it is not limited to such standards and protocols. Other similar standards and protocols not mentioned herein are in existence and considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A computer-implemented method for managing an enterprise, the method comprising:
    establishing a web based chat communication session with a customer;
    monitoring a parameter associated with the web based chat communication session, which is associated with an emotional state of the customer;
    computing a confidence score on a scale based on the monitored parameter of the web based chat communication session;
    computing a threshold based on the confidence score of the web based chat communication session, confidence scores of other current web based chat communications at the enterprise, and an availability of resources at the enterprise;

comparing the computed confidence score with the calculated threshold; and allocating a select one of the resources to the web based chat communication session, wherein a determination of when the allocation is performed is based on the comparing of the computed confidence score with the calculated threshold.

2. The method of claim 1, wherein the web based chat communication session is an automated web based chat communication session.

3. The method of claim 1, wherein the computed confidence score is dynamic.

4. The method of claim 1, wherein the computed confidence score is computed by using fuzzy logic.

5. The method of claim 1, further comprising enabling a supervisor to select the allocated select one of the resources based on the computed confidence score.

6. The method of claim 1, further comprising routing the web based chat communication session to the allocated select one of the resources.

7. The method of claim 1, wherein the allocated select one of the resources is associated with one of a reserve agent, an agent, a supervisor, or a Subject Matter Expert (SME).

8. A resource managing computer system comprising a processor coupled to memory that includes program code for managing an enterprise, wherein the processor executes the program code to:

establish a web based chat communication session with a customer;

monitor a parameter associated with the web based chat communication session, which is associated with an emotional state of the customer;

compute a confidence score on a scale based on the monitored parameter ofthe web based chat communication session;

compute athreshold based on the confidence score of the web based chat communication session, confidence scores of other current web based chat communications at the enterprise, and an availability of resources at the enterprise;

comparing the computed confidence score with the calculated threshold; and allocate a select one of the resources to the web based chat communication session, wherein a determination of when the allocation is performed is based on the comparing ofthe computed confidence score with the calculated threshold.

9. The system of claim 8, wherein the program code to establish a web based chat communication session with a customer comprises program code to establish an automated web based chat communication session with the customer.

10. The system of claim 8, wherein the program code to compute a confidence score on a scale based on the monitored parameter of the web based chat communication session comprises program code to compute the computed confidence score by using fuzzy logic.

11. The system of claim 8, wherein the program code to compute a confidence score on a scale based on the monitored parameter of the web based chat communication session comprises program code to compute the confidence score dynamically.

12. The system of claim 8, wherein the processor further executes the program code to optimize a number of active web based chat communication sessions that require agent assistance.

13. The system of claim 8, wherein the processor further executes the program code to route the web based chat communication session to the allocated select one of the resources.

14. The system of claim 8, wherein the program code to allocate the select one of the resources comprises program code to associate the select one of the resources with one of a reserve agent, an agent, a supervisor, or a Subject Matter Expert (SME).

15. A computer-implemented method for managing an enterprise, the method comprising:

establishing a web based chat communication session with a customer;

monitoring a parameter associated with the web based chat communication session, which is associated with an emotional state of the customer;

computing a confidence score on a scale based on the monitored parameters of the web based chat communication session;

computing a threshold based on the confidence score of the web based chat communication session, confidence scores of other currentweb based chat communications at the enterprise, and an availability of resources at the enterprise;

allocating a select one ofthe resources to the web based chat communication session, wherein a determination of when the allocation is performed is based on the comparing ofthe computed confidence score with the calculated threshold; and routing the web based chat communication session to the allocated select one of the resources.

16. The computer-implemented method of claim 1, wherein:

computing athreshold based on the confidence score and an availability of resources at the enterprise further includes computing a threshold based on the confidence score, a number of chat communication sessions with a similar confidence score, and the availability of resources at the enterprise.

17. The system of claim 8, wherein the program code to compute a threshold based on the confidence score and an availability of resources at the enterprise further includes program code to compute a threshold based on the confidence score, a number of chat communication sessions with a similar confidence score, and the availability ofresources at the enterprise.

18. The computer-implemented method of claim 15, wherein:

computing a threshold based on the confidence score and an availability of resources at the enterprise further includes computing a threshold based on the confidence score, a number of chat communication sessions with a similar confidence score, and the availability of resources at the enterprise.

* * * * *

UNITED STATES PATENT AND TRADEMARK OFFICE
CERTIFICATE OF CORRECTION

PATENT NO. : 11,621,932 B2
APPLICATION NO. : 14/530121
DATED : April 4, 2023
INVENTOR(S) : Tony McCormack et al.

It is certified that error appears in the above-identified patent and that said Letters Patent is hereby corrected as shown below:

In the Claims

Column 18, Line 64, Claim 1, "parameter ofthe web" should read --parameter of the web--.
Column 19, Line 37, Claim 8, "parameter ofthe web" should read --parameter of the web--.
Column 19, Line 39, Claim 8, "compute athreshold" should read --compute a threshold--.
Column 19, Line 49, Claim 8, "comparing ofthe computed" should read --comparing of the computed--.
Column 20, Line 29, Claim 15, "other currentweb" should read --other current web--.
Column 20, Line 32, Claim 15, "one ofthe resources" should read --one of the resources--.
Column 20, Line 35, Claim 15, "comparing ofthe computed" should read --comparing of the computed--.
Column 20, Line 41, Claim 16, "computing athreshold" should read --computing a threshold--.
Column 20, Line 52, Claim 17, "availability ofresources" should read --availability of resources--.

Signed and Sealed this
Twenty-third Day of January, 2024

Katherine Kelly Vidal
*Director of the United States Patent and Trademark Office*